US 9,735,690 B2

(12) United States Patent
Hung et al.

(10) Patent No.: US 9,735,690 B2
(45) Date of Patent: Aug. 15, 2017

(54) LINE FREQUENCY RIPPLE REDUCTION IN A RESONANT CONVERTER

(71) Applicant: Dell Products, L.P., Round Rock, TX (US)

(72) Inventors: Tsai-Fu Hung, Taipei (TW); Yu-Hung Lai, Taipei (TW); Shih-Chieh Wang, Taipei (TW); Feng-Yu Wu, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 20 days.

(21) Appl. No.: 14/879,146

(22) Filed: Oct. 9, 2015

(65) Prior Publication Data

US 2017/0104417 A1    Apr. 13, 2017

(51) Int. Cl.
*H02M 3/335* (2006.01)
*H02M 1/14* (2006.01)
*H02M 1/42* (2007.01)

(52) U.S. Cl.
CPC ......... *H02M 3/33546* (2013.01); *H02M 1/14* (2013.01); *H02M 1/42* (2013.01)

(58) Field of Classification Search
CPC ................... H02M 1/14; H02M 1/15; H02M 3/335–3/33592
See application file for complete search history.

(56) References Cited

U.S. PATENT DOCUMENTS

| 6,058,034 A | * | 5/2000 | Cummings | H02M 3/00 363/74 |
| 2012/0250360 A1 | * | 10/2012 | Orr | H02M 3/3376 363/21.02 |
| 2014/0009978 A1 | * | 1/2014 | Brinlee | H02M 3/33569 363/25 |
| 2014/0160805 A1 | * | 6/2014 | Oh | H02M 3/33507 363/21.02 |
| 2014/0268907 A1 | * | 9/2014 | Cinagrossi | H02M 3/285 363/21.02 |

* cited by examiner

*Primary Examiner* — Harry Behm
*Assistant Examiner* — Peter Novak
(74) *Attorney, Agent, or Firm* — Fogarty LLP

(57) ABSTRACT

Systems and methods for reducing the line frequency ripple in a resonant converter are described. In some embodiments, a power supply includes a switching network; an LLC resonant tank coupled to the switching network; a rectifier coupled to the LLC resonant tank; and a control circuit coupled to the switching network and to the rectifier, where the control circuit is configured to modify an operating frequency of the switching network to reduce a line frequency ripple at an output of the rectifier.

15 Claims, 6 Drawing Sheets

LINE FREQUENCY RIPPLE REDUCTION IN A RESONANT CONVERTER

FIELD

This disclosure relates generally to power supplies, and more specifically, to systems and methods for reducing the line frequency ripple in a resonant converter.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Generally speaking, IHSs include power supplies. A power supply provides electrical energy to an electronic device. Certain power supplies are discrete, stand-alone components, whereas others are built into larger devices. Examples of the latter include the power supplies found in desktop computers and consumer electronics.

Because the type of power generally available to any given device (e.g., from an electrical socket) is usually different from what the device needs to operate as designed, power supplies also include power converters. A power converter is a circuit for converting electrical energy; an example is the AC-DC (alternating-to-direct current) converter. The inventors hereof have recognized that emerging applications and the introduction of new regulations regarding efficient use of energy are pushing designers to find more and more efficient and improved AC-DC conversion systems.

SUMMARY

Embodiments of systems and methods for reducing the line frequency ripple in a resonant converter are described herein. In an illustrative, non-limiting embodiment, a power supply may include a switching network; an LLC resonant tank coupled to the switching network; a rectifier coupled to the LLC resonant tank; and a control circuit coupled to the switching network and to the rectifier, where the control circuit is configured to modify an operating frequency of the switching network to reduce a line frequency ripple at an output of the rectifier.

The switching network may include at least two switches coupled in series with a Power Factor Correction (PFC) circuit, such that the LLC resonant tank is coupled to a node between the at least two switches. The LLC resonant tank may include an LC network coupled to a transformer, wherein the rectifier is coupled to the transformer. The control circuit may include a feedback network coupled to a controller. The controller may be coupled to the switching network and to the PFC circuit. The feedback circuit may be configured to amplify an error between the output of the rectifier and a voltage reference, and to provide an amplified error signal to the controller.

The controller may be configured to use LLC series resonant converter (LLC-SRC) gain data to determine an operating frequency that regulates output voltage to specified value and reduces the line frequency ripple. The operating frequency may be determined based at least in part upon the amplified error signal and a sample line frequency ripple at the PFC circuit. The power supply may be in a current sharing configuration with respect to another power supply within an Information Handling System (IHS). In some cases, the power supply and the other power supply may be provided by different vendors.

In another illustrative, non-limiting embodiment, an Information Handling System may include a processor; a memory coupled to the processor; and a power supply coupled to the processor and to the memory, where the power supply includes two or more power supply units (PSUs) in a current sharing configuration, and where at least a given one of the PSUs further comprises: a switching network; an LLC resonant tank coupled to the switching network; a rectifier coupled to the LLC resonant tank; and a control circuit coupled to the switching network and to the rectifier, wherein the control circuit is configured to modify an operating frequency of the switching network to reduce a line frequency ripple at an output of the rectifier.

In yet another illustrative, non-limiting embodiment, a method may include, in a power supply having a switching network, an LLC resonant tank coupled to the switching network, a rectifier coupled to the LLC resonant tank, and a control circuit coupled to the switching network and to the rectifier: monitoring, by a feedback network within the control circuit, an error between the output of the rectifier and a voltage reference; amplifying the error; and modifying, by the control circuit, an operating frequency of the switching network to reduce a line frequency ripple at an output of the rectifier based, at least in part, upon the amplified error and a sampled PFC bulk capacitor ripple.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

As described above, IHSs may also include Power Supply Units (PSUs) in parallel. Each PSU may include a resonant tank or the like. Particularly in the case of LLC resonant topologies, however, when the LLC circuit operates at a frequency near its natural frequency $f_r$, the circuit's output voltage has a 100/120 Hz rectified line frequency ripple that worsens current sharing performance in redundant PSU applications, and especially in mixed vendors applications. The rectified 100/120 Hz line frequency is originated by an upstream Power Factor Correction (PFC) stage or circuit. A PFC stage converts rectified AC 50/60 Hz line voltage to a DC 400 V, so this 400 VDC includes a 100/120 Hz ripple, which is load dependent. When the operating frequency of the LLC circuit moves away from $f_r$, the 100/120 Hz ripple is easy to reduce as higher loop gain. But again, when the operating frequency of the LLC circuit is near $f_r$, ripple reduction is difficult to achieve.

To address these, and other problems, the inventors hereof have developed systems and methods for reducing the line frequency ripple in an LLC resonant converter, as described in more detail below.

Figure 1:
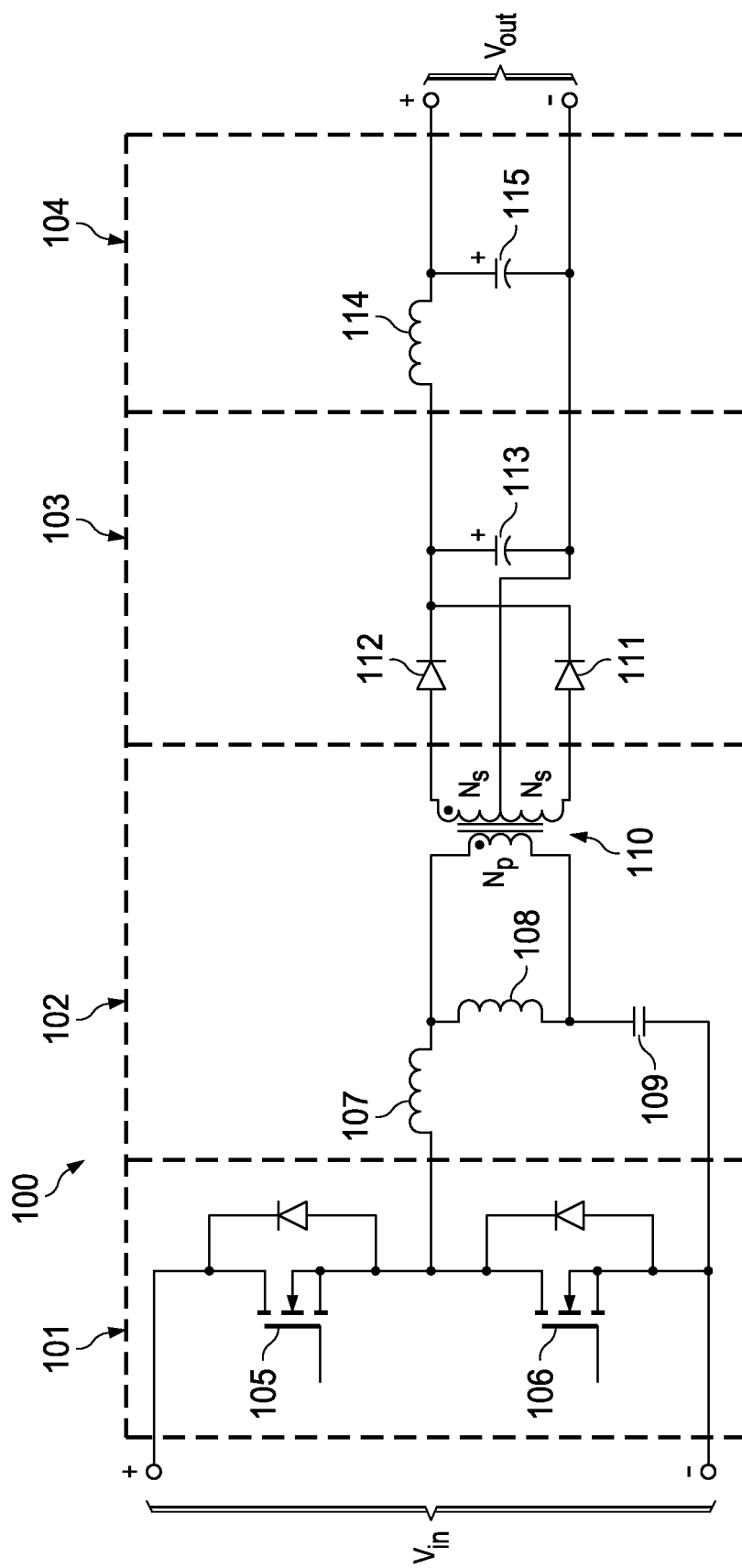
FIG. 1 shows a circuit diagram of an example of an LLC converter according to some embodiments.

FIG. 1 shows a circuit diagram of an example of an LLC converter according to some embodiments. Particularly, LLC converter 100 includes switching network 101, LLC resonant tank 102, rectifier 103, and output filter 104. Switching network 101 receives input voltage $V_{in}$ and includes switches 105 and 106, which are turned on and off in an alternating fashion. LLC resonant tank 102 includes inductors 107 and 108, capacitor 109, and transformer 110 with primary and secondary windings Np and Ns, respectively, in which inductor 108 is magnetizing inductor of transformer 110. Rectifier 103 includes two diodes 111 and 112, as well as capacitor 113. Output filter 104 includes inductor 114 and capacitor 115, across which output voltage $V_{OUT}$ is provided. These various components may be coupled to each other as shown.

Figure 2:
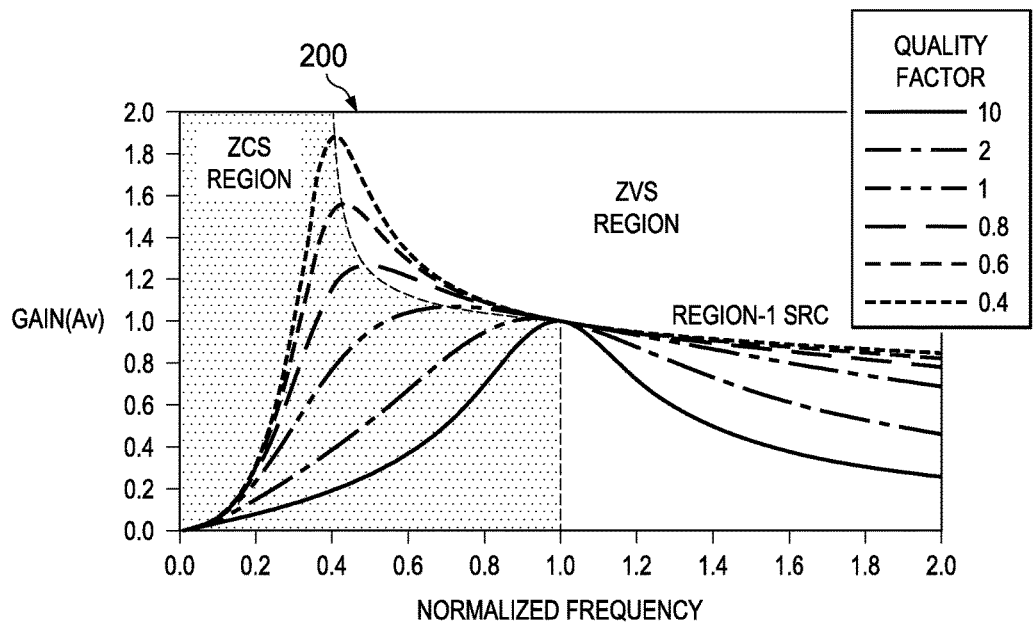
FIG. 2 is a graph of an example of an LLC series resonant converter (LLC-SRC) gain curve according to some embodiments.

Operation of LLC converter 100 may be controlled, for example, using LLC series resonant converter (LLC-SRC) gain curve 200 of FIG. 2, according to some embodiments. Particularly, the normalized operating frequency of switching network 101, and therefore the frequency of the input signal provided to LLC tank 102, is given in the horizontal axis. Meanwhile, the corresponding gain in the vertical axis. As a person of ordinary skill in the art will recognize in light of this disclosure, graph 200 also includes different "regions" such as a Zero Voltage Switching (ZVS) region and a Zero Current Switching (ZCS) region, and various quality factors.

Generally speaking, the operating frequency of LLC resonant tank 102 controls the gain at its output node. As such, the frequency with which $V_{IN}$ is alternated by switching network 101 and provided to LLC resonant tank 102 may be used to affect the output signal $V_{OUT}$. The selected operating frequency may be chosen by monitoring $V_{OUT}$ using a feedback network.

FIGS. 3A-B, 4A-C, and 5A-B are diagrams of examples of feedback network configurations and accompanying error amplification curves according to some embodiments. All configurations shown in these figures are intended to feed a PFC bulk capacitor ripple into a control loop to result in a higher operation frequency variation—in other words, a goal is to increase the error signal as shown. (There is another way to get higher error signal by increasing Av but it can magnify noise and interfere with loop stability.)

Figure 3A:
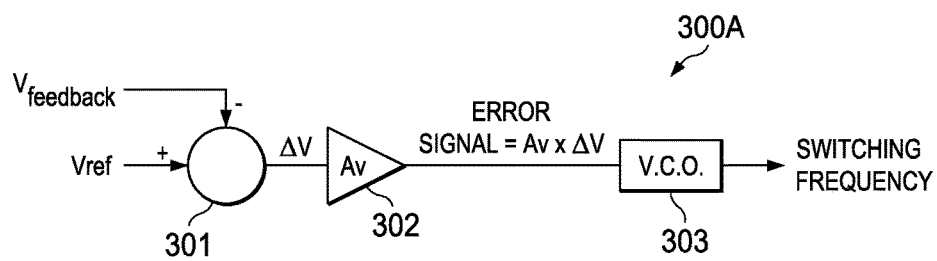
FIGS. 3A-B, 4A-C, and 5A-B are diagrams of examples of feedback network configurations and accompanying error amplification curves according to some embodiments.
Figure 3B:
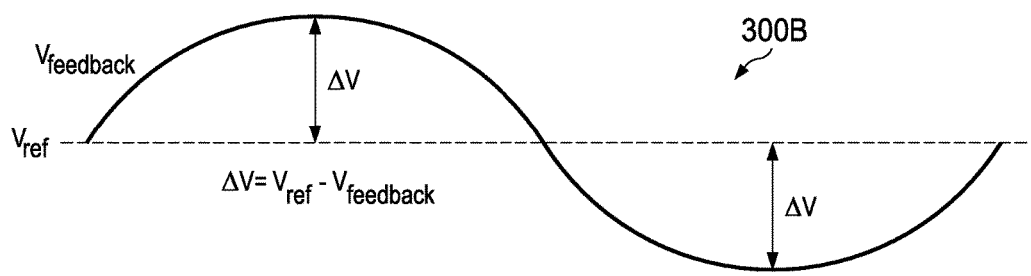

In FIGS. 3A-B, feedback network 300A includes a mixer 301 which sums up reference voltage $V_{ref}$ and output voltage $V_{feedback}$, and puts the difference between those voltages, that is, error signal $\Delta V$, through amplifier 302. The output of amplifier 302 controls voltage-controlled oscillator (VCO) 303 to select the operation or switching frequency. Curve 300B shows a corresponding design for $\Delta V$.

Figure 4A:
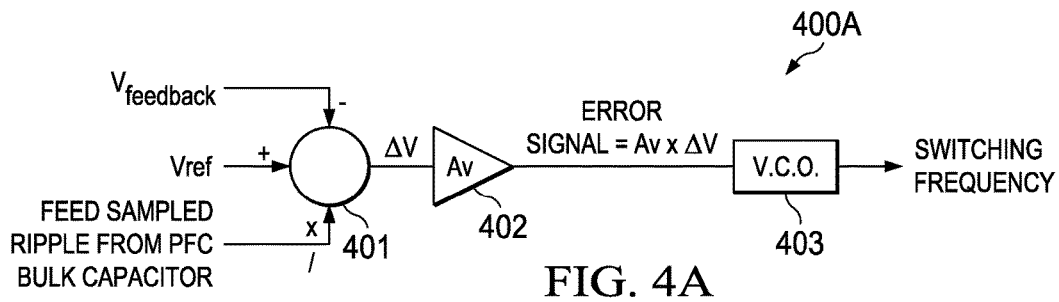
Figure 4B:
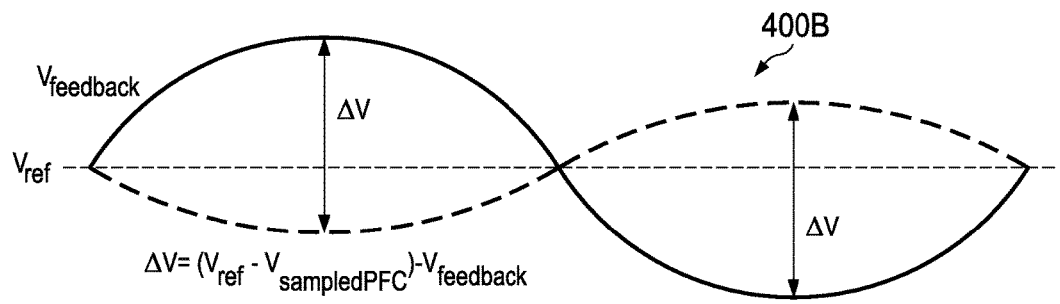
Figure 4C:
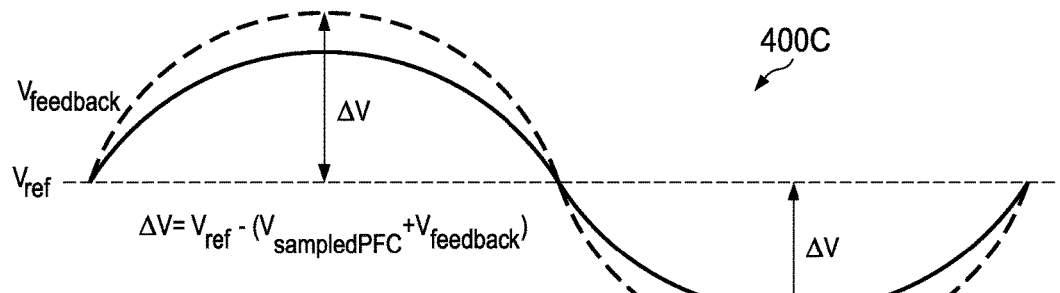

In FIGS. 4A-C, feedback network 400A includes mixer 401, which sums up reference voltage $V_{ref}$, output voltage $V_{feedback}$, and a sampled PFC bulk ripple, gets error signal $\Delta V$ through amplifier 402, and uses the magnified error signal to control VCO 403 to select an operating frequency variation. Curve 400B shows the sampled PFC bulk capacitor ripple fed into mixer 401 reversely, and curve 400C shows that the sampled PFC bulk capacitor ripple is increasing the difference between $V_{feedback}$ and $V_{ref}$.

Figure 5A:
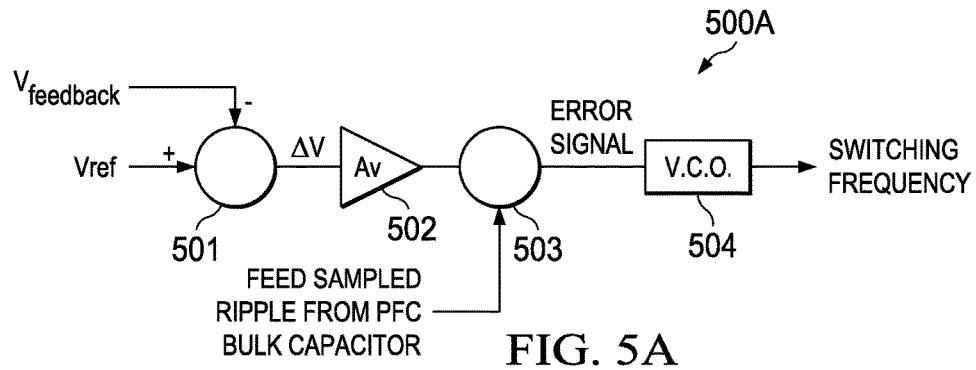
Figure 5B:
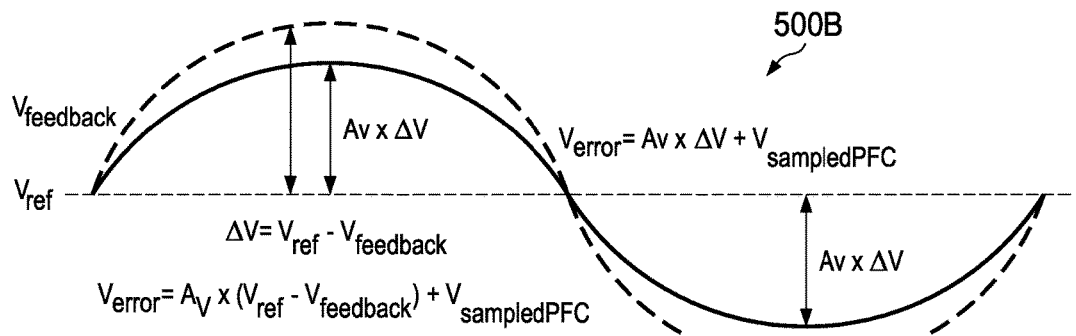

In FIGS. 5A-B, feedback network 500A also includes mixer 501, which sums up reference voltage $V_{ref}$ and output voltage $V_{feedback}$, and provides the sum to amplifier 502. Second mixer 503 sums up the output of amplifier 502 with the sampled PFC bulk capacitor ripple, and VCO 504 decides the switching frequency based upon the output from mixer 503. As such, curve 500B shows a magnified error signal at the output of amplifier 502 with the added up sampled PFC bulk capacitor ripple, which can help set the operating frequency of switching network 101 much faster.

Figure 6A:
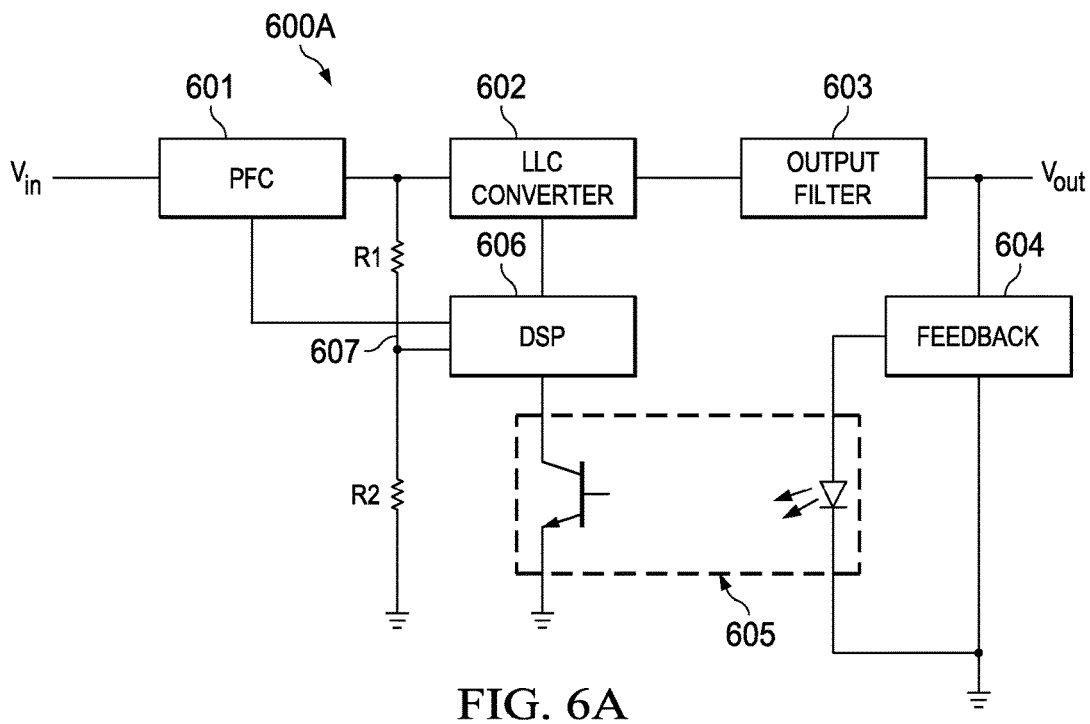
FIGS. 6A-D are block diagrams of systems for reducing the line frequency ripple in a resonant converter according to some embodiments.

FIGS. 6A-D are block diagrams of systems for reducing the line frequency ripple in a resonant converter according to some embodiments. In FIG. 6A, Power Factor Correction (PFC) circuit 601 is coupled to LLC converter 602 (e.g., switching network 101, LLC resonant tank 102, and rectifier 103), which in turn is coupled to output filter 603 (e.g., output filter 104). Output filter 603 provides $V_{OUT}$, which is received by feedback network 604 (e.g., feedback network 500A). Optical coupling 605 provides an error signal to digital signal processor (DSP) 606, and to LLC converter 602. DSP 606 also receives information from output of PFC stage 601 via resistors $R_1$ and $R_2$.

Figure 6B:
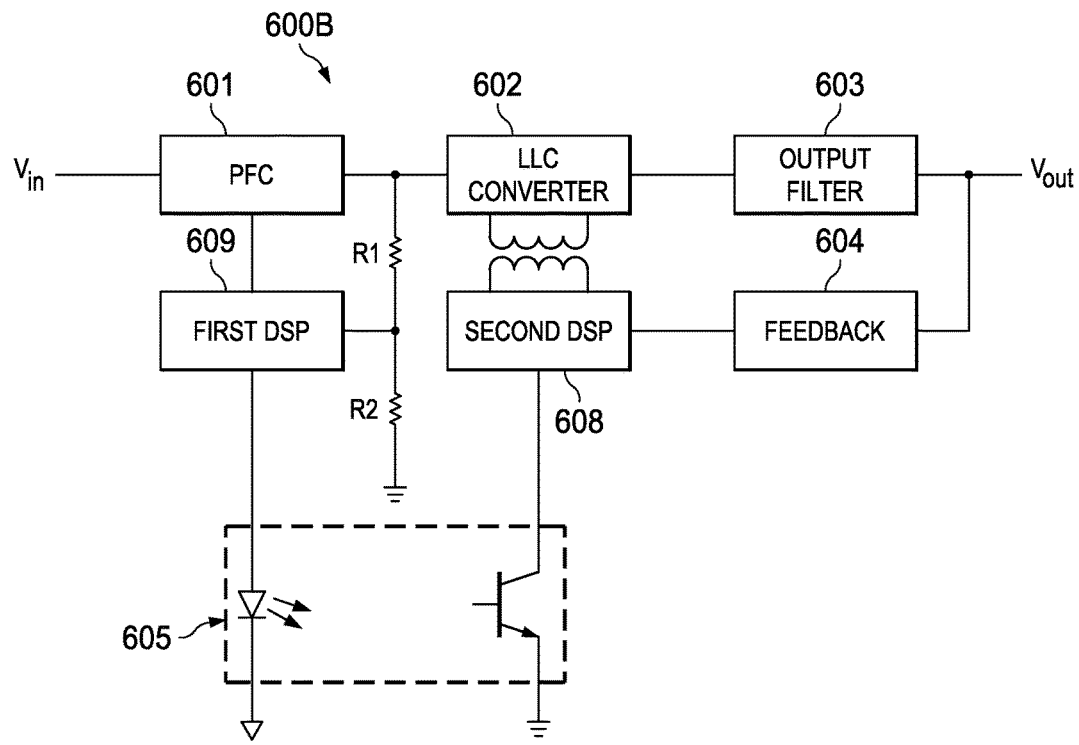
Figure 6C:
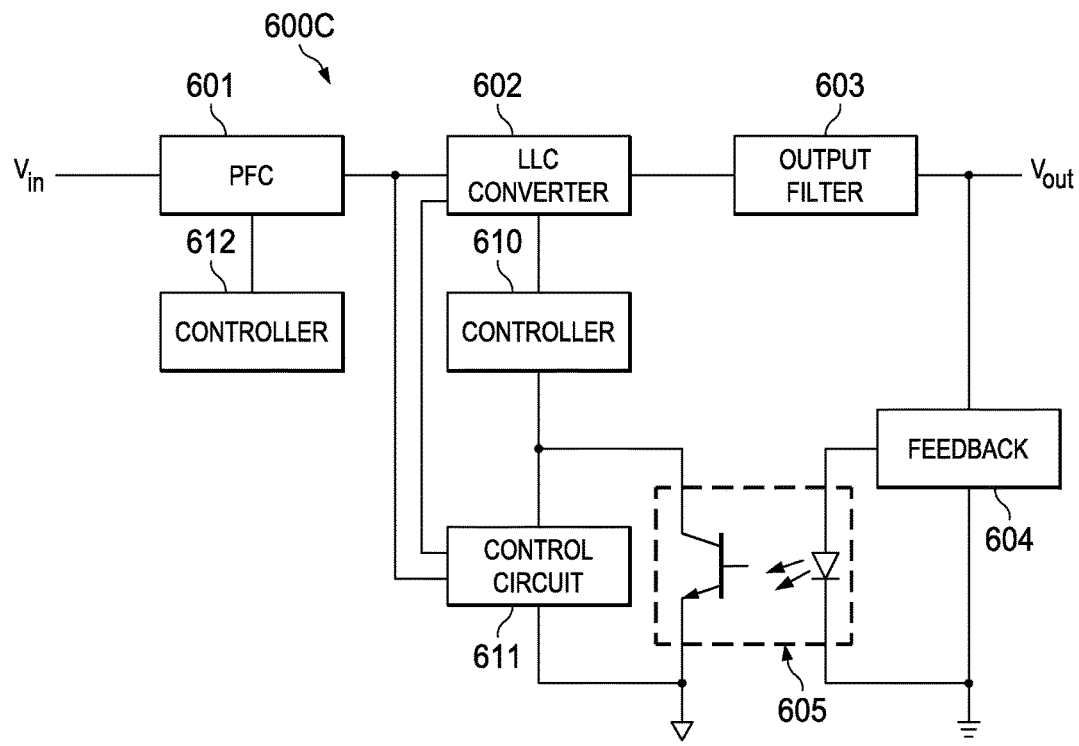
Figure 6D:
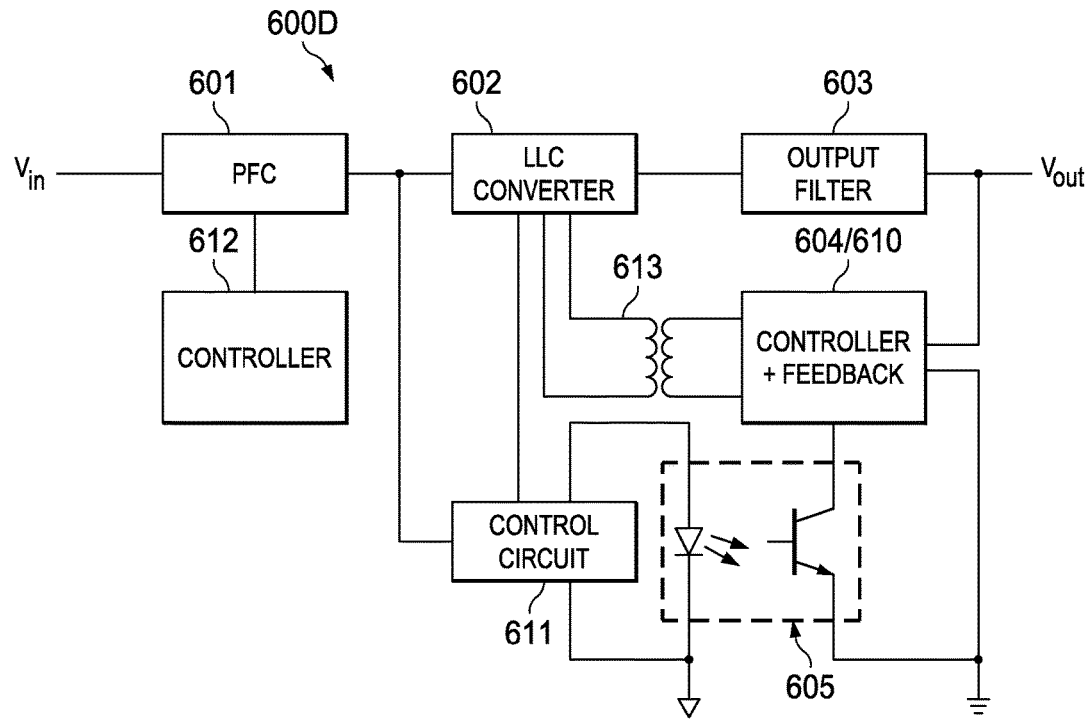

FIG. 6B shows Power Factor Correction (PFC) circuit 601 coupled to LLC converter 602, which in turn is coupled to output filter 603 (e.g., output filter 104). Output filter 603 provides $V_{OUT}$, which is received by feedback network 604 (e.g., feedback network 500A) and provided to second DSP 608 coupled to LLC converter 602 via transformer driver. First DSP 609 is coupled to PFC 601, receives output of PFC stage 601 via resistors $R_1$ and $R_2$, and is optically coupled to second DSP 608.

In FIG. 6C, again Power Factor Correction (PFC) circuit 601 is coupled to LLC converter 602, which in turn is coupled to output filter 603 (e.g., output filter 104). Output filter 603 provides $V_{OUT}$, which is received by feedback network 604 (e.g., feedback network 500A). Optical coupling 605 provides an error signal to controller 610, which is coupled to LLC converter 602 and control circuit 611. Another controller 612 is coupled to PFC 601, and control circuit 611 is also coupled to output of PFC stage and to LLC converter 602.

FIG. 6D shows yet again Power Factor Correction (PFC) capacitor 601 coupled to LLC converter 602, which in turn is coupled to output filter 603 (e.g., output filter 104). Output filter 603 provides $V_{OUT}$, which is received by controller 610 and feedback network 604. Controller and feedback network 604 (e.g., feedback network 400A)+610 are coupled to LLC converter 602 via a transformer driver or the like. Optical coupling 605 provides an error signal to control circuit 611, which is coupled to LLC converter 602 and control circuit 611. Another controller 612 is coupled to PFC 601, and control circuit 611 is also coupled to $V_{IN}$ and to LLC converter 602.

In operation, circuits 600A-D are configured to amplify an error between the output of the rectifier 112 ($V_{OUT}$) and a voltage reference ($V_{ref}$), and to provide an amplified error signal to a controller or DSP. The controller or DSP is configured to use LLC series resonant converter (LLC-SRC) gain data to determine an operating frequency that reduces the line frequency ripple at $V_{OUT}$. For example, the operating frequency may be determined based at least in part upon the amplified error signal and a sampled line frequency ($V_{IN}$) ripple at the PFC bulk capacitor 601.

To illustrate the foregoing of LLC converter operates at frequency around $f_r$ having lowest loop response problem, consider the following example LLC design with Q=0.8 where diodes 111 and 112 are ideal, and the nominal voltage across inductor 108 ($V_{LM}$) is 200 V, half of $V_{in}$ per LLC design. If $V_{in}$ with 100/120 Hz line ripple voltage makes $V_{LM}$ changes such that:

A) when $V_{LM}$=200 V; Vout=12 V, where the normalized gain is 1 and the operating frequency, $f_s$, is equal to $f_r$.

B) when $V_{LM}$=210 V; Vout=12.6 V if operating frequency $f_s$ keeps $f_r$. In this case an LLC controller or DSP may provide a gain of 0.95 to adjust $V_{LM}$ from 210 V to 200 V by increasing operation frequency from $f_r$ to 1.16 $f_r$ for maintaining 12V output voltage.

C) when $V_{LM}$=190 V; Vout=11.39 V if operating frequency $f_s$ keeps $f_r$. In this case an LLC controller or DSP may provide a gain of 1.05 to adjust $V_{LM}$ from 190 V to 200 V by reducing operation frequency from $f_r$ to 0.87 $f_r$ for maintaining 12 V output voltage.

Based on the analysis above, assume $V_{IN}$ has 120 Hz line ripple of amplitude 20 V, the design loop may need adjust the frequency range from 0.87 $f_r$~1.16$f_r$≈0.4$f_r$ to regulate $V_{in}$ 20V ripple, it is a significant frequency variation and the LLC control loop is not capable to compensate in time. Therefore, we feed PFC bulk capacitor ripple into control loop deliberately to increase control loop error signal as PFC bulk ripple and is proportional to the output ripple.

As another example, consider a SRC (i.e., $f_s$>$f_r$) design with Q=10 where the nominal voltage across inductor 108 ($V_{LM}$) is 175 V. If $V_{in}$ with 100/120 Hz line ripple voltage makes $V_{LM}$ change such that:

A) when $V_{LM}$=175 V; Vout=12 V, where the normalized gain is 0.875 and the operating frequency is equal to 1.11 $f_r$.

B) when $V_{LM}$=185 V; Vout=12.68 V if the operating frequency $f_s$ keeps 1.11 $f_r$. In this case a controller or DSP may provide a gain of 0.827 to adjust $V_{LM}$ from 185 V to 175 V by increasing operation frequency from 1.11 $f_r$ to 1.12 $f_r$ for maintaining 12 V output voltage.

C) when $V_{LM}$=165 V; Vout=11.32 V if operation frequency $f_s$ keeps 1.11 $f_r$. In this case the controller or DSP may provide a gain of 0.928 to adjust $V_{LM}$ from 165 V to 175 V by increasing operation frequency from 1.11 $f_r$ to 1.1 $f_r$ for maintaining 12V output voltage.

Now assume that $V_{IN}$ has the same ripple amplitude 20V/120 Hz as previous example. SRC control loop may need the frequency variation about 1.1~1.12×$f_r$≈0.02 $f_r$. Ordinarily, the actual error signal would be sufficient to adjust frequency range quickly since the required frequency variation is quite small.

Figure 7:
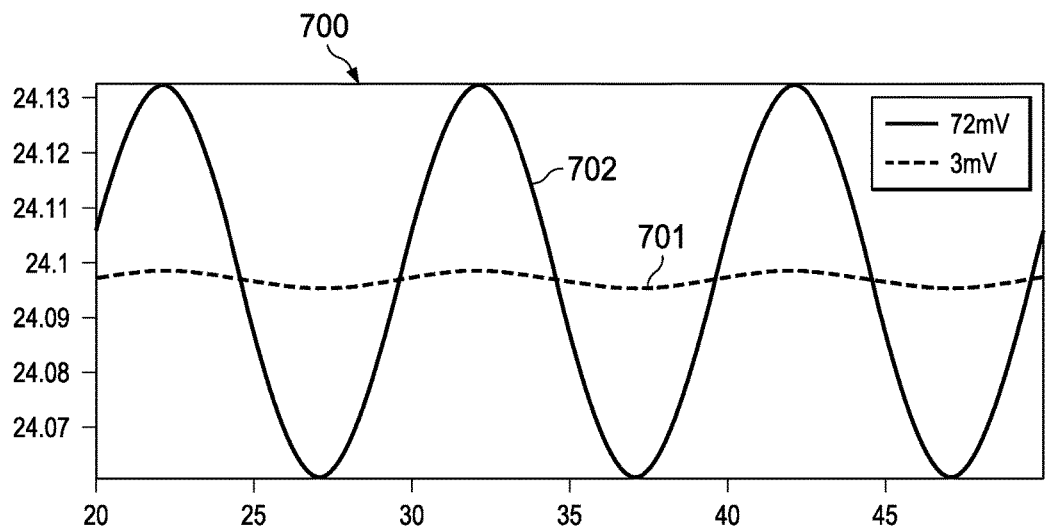
FIG. 7 is a graph illustrating a reduced line frequency ripple according to some embodiments.

FIG. 7 is a graph illustrating a reduced line frequency ripple according to some embodiments. Particularly, curve 702 shows the line frequency ripple without reduction over time, which has a magnitude of 72 mV in this example. Moreover, curve 701 shows the line frequency ripple resulting from the systems and methods described herein, which has a magnitude of 3 mV—thus representing a reduction of 95% over conventional circuits.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A power supply, comprising:
a switching network;
an LLC resonant tank coupled to the switching network;
a rectifier coupled to the LLC resonant tank; and
a control circuit coupled to the switching network and to the rectifier, wherein the control circuit is configured to modify an operating frequency of the switching network to reduce a line frequency ripple at an output of the rectifier, wherein the control circuit includes a feedback network comprising:
  a first mixer configured to subtract: (i) a voltage at the output of the rectifier from (ii) a reference voltage;
  an amplifier coupled to the first mixer;
  a second mixer coupled to the amplifier, the second mixer configured to add: (i) a sampled Power Factor Correction (PFC) bulk capacitor ripple to (ii) an output of the amplifier; and
  a voltage controlled oscillator (VCO) coupled to the second mixer.

2. The power supply of claim 1, wherein the switching network includes at least two switches coupled in series with a PFC circuit, and wherein the LLC resonant tank is coupled to a node between the at least two switches.

3. The power supply of claim 2, wherein the LLC resonant tank includes an LLC network coupled to a transformer, wherein the rectifier is coupled to the transformer.

4. The power supply of claim 3, wherein the feedback network is coupled to a controller.

5. The power supply of claim 4, wherein the controller is coupled to the switching network and to the PFC circuit.

6. The power supply of claim 5, wherein the feedback circuit is configured to detect an error between the output of the rectifier and a voltage reference.

7. The power supply of claim 6, wherein the feedback circuit is configured to provide an amplified error signal to the controller.

8. The power supply of claim 7, wherein the controller is configured to use LLC series resonant converter (LLC-SRC) gain data to determine an operating frequency that regulates output voltage to specified value and reduces the line frequency ripple.

9. The power supply of claim 8, wherein the operating frequency is determined based at least in part upon the amplified error signal and a sample line frequency ripple at the PFC circuit.

10. In a power supply comprising a switching network, an LLC resonant tank coupled to the switching network, a rectifier coupled to the LLC resonant tank, and a control circuit coupled to the switching network and to the rectifier, a method comprising:
modifying, via the control circuit, an operating frequency of the switching network; and
reducing, via the control circuit, a line frequency ripple at an output of the rectifier, wherein the control circuit includes a feedback network comprising:
  a first mixer configured to subtract: (i) a voltage at the output of the rectifier from (ii) a reference voltage;
  an amplifier coupled to the first mixer;
  a second mixer coupled to the amplifier, the second mixer configured to add: (i) a sampled Power Factor Correction (PFC) bulk capacitor ripple to (ii) an output of the amplifier; and
  a voltage controlled oscillator (VCO) coupled to the second mixer.

11. The method of claim 10, wherein the switching network includes at least two switches coupled in series with a PFC circuit, and wherein the LLC resonant tank is coupled to a node between the at least two switches.

12. The method of claim 11, wherein the LLC resonant tank includes an LLC network coupled to a transformer, wherein the rectifier is coupled to the transformer.

13. The method of claim 12, wherein the feedback network is coupled to a controller.

14. The method of claim 13, wherein the controller is coupled to the switching network and to the PFC circuit.

15. The method of claim 14, wherein the controller is configured to use LLC series resonant converter (LLC-SRC) gain data to determine an operating frequency that regulates output voltage to specified value and reduces the line frequency ripple.

* * * * *